Oct. 29, 1940. W. L. HANSEN ET AL 2,219,387
OIL TRAP FOR MOTORS
Filed April 24, 1937 2 Sheets-Sheet 1
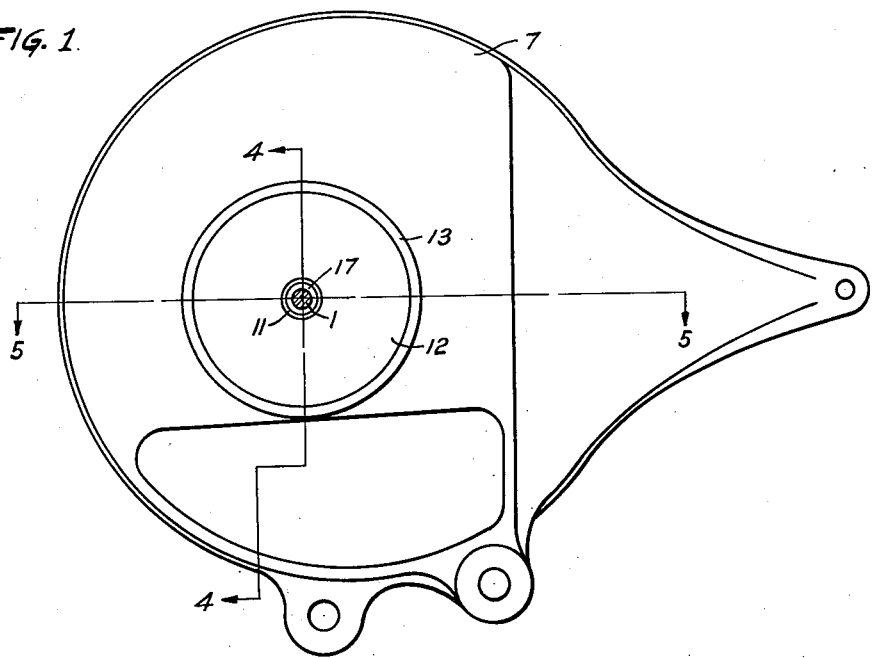
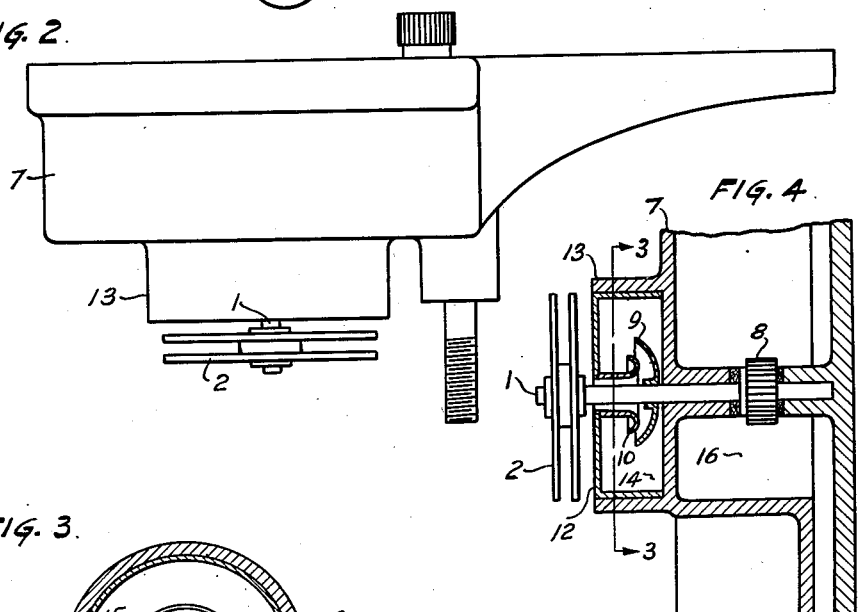
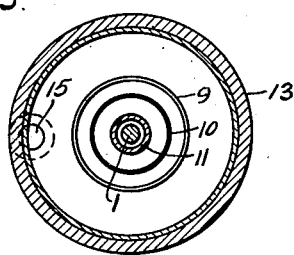
INVENTORS
WILLIAM L. HANSEN,
IRA N. HURST.
BY
Toulmin & Toulmin
ATTORNEYS

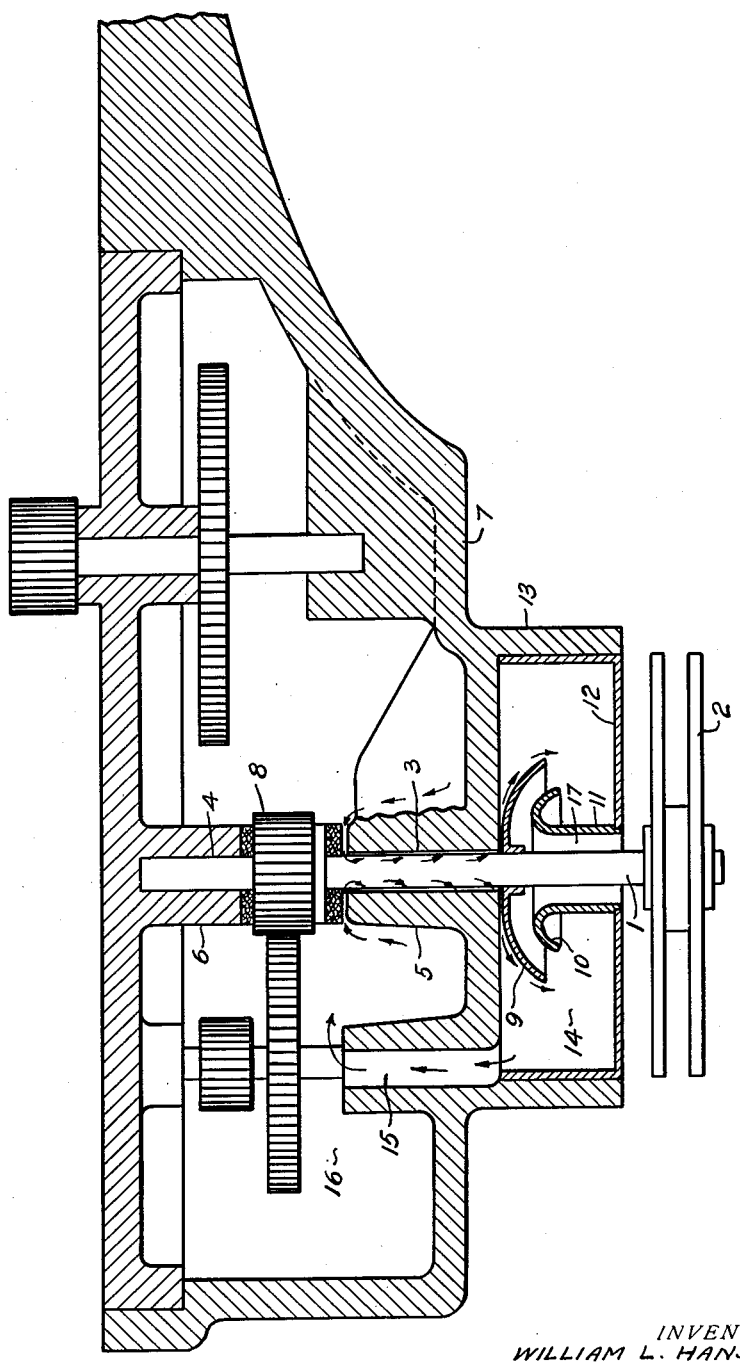

Patented Oct. 29, 1940

2,219,387

UNITED STATES PATENT OFFICE 2,219,387

OIL TRAP FOR MOTORS

William L. Hansen and Ira N. Hurst, Princeton, Ind., assignors to Hansen Mfg. Company, Inc., Princeton, Ind., a corporation of Indiana Application April 24, 1937, Serial No. 138,866

1 Claim. (Cl. 308—36.4)

Our invention relates to motors and in particular to gear boxes for containing lubricants for use in connection with motors and the associated gearing.

It is our object to overcome the difficulties heretofore experienced due to the draining of gear boxes of synchronous electric motors by reason of capillary attraction.

It is our object to provide an oil trap chamber which allows the oil to flow through the rotor bearing freely, along the shaft, and back into the gear chamber. By this arrangement we have found that when a motor is stored with its gear box having the requisite supply of lubricant, with the rotor down, the oil is not drained from the gear box by capillary attraction adjacent the rotor shaft.

It is our object to provide as a solution of this problem an umbrella-shaped shield which is sealed to the shaft around which the oil will flow and over which it will drip into an oil trap chamber, whence it returns to its original oil reservoir. In other words, our object is to accept the necessary movement of the oil due to capillary attraction and to provide a means for taking care of this condition to prevent the oil from leaking out of the gear box permanently.

Our further object is to eliminate any difficulties heretofore experienced when the motor is operated in a tilted position. Heretofore the speed of the rotor was limited when it was in tilted position and thrown out of synchronism by the rotor having to pull through the oil. By our invention we can enclose our rotors for protection but we do not use this enclosure as a support for the rotor shaft as well as a means for holding oil in the gear case, so that the rotor can turn perfectly freely without being impeded by mechanism for attempting to retain oil in the gearing.

Figure 1 is a front elevation of the gear case.

Figure 2 is a top plan view thereof.

Figure 3 is a section on the line 3—3 of Figure 4.

Figure 4 is a section on the line 4—4 of Figure 1 looking in the direction of the arrows.

Figure 5 is an enlarged view on the section line 5—5 of Figure 1 looking in the direction of the arrows. This last view is exaggerated as to the clearance between the drive shaft and its supporting bearing. This has been done to illustrate the principle of this invention.

Referring to the drawings in detail, 1 is the drive shaft upon which are mounted the rotor disks 2 of the synchronous electric motor which has been omitted for the purpose of clarity. This drive shaft is mounted within bearings 3 and 4 formed in sleeves 5 and 6 in the gear case 7. The exact details of the gearing are not important, but sufficient of the gearing is illustrated to indicate the general arrangement thereof. There is mounted on the shaft 1 a pinion 8.

The oil within the gear case 7 tends to travel along the shaft 1 by capillary attraction. When it does so, it engages an umbrella-shaped shield 9 mounted on the shaft 1 so that the oil drains off to one side of the umbrella-shaped guard 10 which is spaced at 11 from the shaft 1 and is mounted upon the enclosing cover 12 that is slidably fitted within the sleeve 13 of the gear housing 7. When the oil is thus thrown off into the chamber 14 so formed, it is returned through the drain passageway 15 to the interior 16 of the gear case 7. Thus the oil seeping along the shaft 1 through bearing space 3 by capillary attraction is either thrown off by centrifugal force or drips into the compartment 14 so that it is immediately returned through the passageway 15 to the interior of the gear case 7 as at 16. The rotor 2 is unimpeded in its operation. No matter in what position the gear case or motor is placed, the umbrella 9 cooperating with the spaced umbrella 10 discharges the oil into the compartment 14 so that it can drain back into the original source of supply. The space around the shaft 1 between the shaft and the sleeve 11 and between the umbrellas 9 and 10 which is designated 17 provides an air vent to the oil trap chamber 14. The cover 12 which has a depending flange extending within the sleeve 13 is usually made of resilient metal so that its spring-like characteristics hold it firmly in place within the rigid gear sleeve casing 13.

It will be understood that the oil has a tendency to travel along the bearing sleeve 5 on the outside and also from the gear train in the box to the focal point on the rotating pinion 8. When the oil passes along the capillary path on the outside of the shaft 1 into the oil trap chamber 14, there is no way for it to get out so that it must return through the passageway 15 to the gear case. The oil cannot bridge across the gap between the umbrellas 9 and 10 so that there is no way for it to escape from the oil trap chamber 14.

It will be understood that we desire to comprehend within our invention such modifications as may be clearly embraced within the claim and scope of our invention.

Having thus fully described our invention, what we claim as new and desire to secure by Letters Patent is:

In combination, a gear casing, a shaft projecting through one wall thereof, an oil trap chamber formed around said shaft adjacent said gear casing and through which the shaft projects in spaced relationship, a closure member on said oil trap chamber opposite said gear casing wall, an elongated sleeve extending inwardly from said closure member into said oil trap chamber and spaced annularly from said shaft for forming an elongated passageway along and around the shaft, said sleeve having a flared end directed reversely toward said closure member, a flared oil-throwing rotor coextensive with the flared end of said sleeve and mounted on said shaft within said oil trap chamber, said oil-throwing rotor extending beyond the flared end of said sleeve, and having its flared portion substantially equidistantly spaced from the flared end of said sleeve, said closure member having side wall means extending into said oil trap chamber toward said gear casing wall whereby to form with said sleeve an annular drip cup around said shaft for receiving the oil drip from said oil-throwing rotor when said casing is positioned with said shaft vertical and with said oil-throwing rotor above said sleeve.

WILLIAM L. HANSEN.
IRA N. HURST.